United States Patent
Musgrave

(10) Patent No.: US 6,208,746 B1
(45) Date of Patent: *Mar. 27, 2001

(54) BIOMETRIC WATERMARKS

(75) Inventor: Clyde Musgrave, Frisco, TX (US)

(73) Assignee: GTE Service Corporation, Irving, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,219

(22) Filed: Dec. 31, 1997

Related U.S. Application Data

(60) Provisional application No. 60/067,008, filed on Dec. 1, 1997, provisional application No. 60/055,534, filed on Aug. 13, 1997, and provisional application No. 60/046,012, filed on May 9, 1997.

(51) Int. Cl.[7] .............................. G06K 9/00; G06F 7/04; G06F 17/60; H04L 9/00
(52) U.S. Cl. .................... 382/100; 382/116; 340/825.31; 705/58; 713/186
(58) Field of Search .................................. 382/100, 115, 382/116, 117, 118, 119, 120, 121, 122, 123, 124, 135, 232, 250; 380/3, 4, 23, 51, 54; 713/176, 185, 186; 340/825.31; 705/57, 58

(56) References Cited

U.S. PATENT DOCUMENTS

| | | | |
|---|---|---|---|
| 4,109,237 | 8/1978 | Hill | 382/117 |
| 4,405,829 | 9/1983 | Rivest et al. | 380/30 |
| 5,214,699 | 5/1993 | Monroe et al. | 380/23 |
| 5,224,173 | 6/1993 | Kuhns et al. | 382/116 |
| 5,259,025 | 11/1993 | Monroe et al. | 380/23 |
| 5,386,104 | 1/1995 | Sime | 235/379 |
| 5,412,727 | 5/1995 | Drexler et al. | 380/24 |
| 5,428,357 | 6/1995 | Haab et al. | 341/155 |
| 5,457,747 | 10/1995 | Drexler et al. | 380/24 |
| 5,469,506 | * 11/1995 | Berson et al. | 380/23 |
| 5,581,630 | 12/1996 | Bonneau, Jr. | 382/116 |
| 5,619,620 | 4/1997 | Eccles | 706/20 |
| 5,623,545 | 4/1997 | Childs et al. | 380/2 |
| 5,841,886 | * 11/1998 | Rhoads | 382/115 |
| 5,862,260 | * 1/1999 | Rhoads | 382/232 |
| 5,864,622 | * 1/1999 | Marcus | 380/23 |
| 5,915,027 | * 6/1999 | Cox et al. | 380/54 |
| 5,915,973 | * 6/1999 | Hoehn-Saric et al. | 434/350 |
| 5,933,498 | * 8/1999 | Schneck et al. | 380/4 |

OTHER PUBLICATIONS

Copyright Protection for Electronic Publishing over Computer Networks, Choudhury et al; IEEE Network, ISSN: 0890–8044, vol. 9, pp. 12–20, May 1995.*

High Confidence Personal Identification by Rapid Video Analysis of Iris Texture, J. Daugman; IEEE Proceedings on Security Technology, ISBN: 0–7803–0568–X, pp. 50–60, Oct. 1992.*

\* cited by examiner

Primary Examiner—Andrew W. Johns
Assistant Examiner—Mehrdad Dastouri
(74) Attorney, Agent, or Firm—Leonard Charles Suchyta

(57) ABSTRACT

A biometric watermark system and method generate a biometrically encoded bitstream from biometric data of a user and from electronic data to be transmitted to the user. The encoded bitstream has the biometric data acting as a biometric watermark. The encoded bitstream is then sent to a decoder of the user, with the biometric watermark providing security in the transmission in order to prevent unauthorized users from extracting the electronic data. The decoder utilizes the biometric data of the user to decode the biometrically encoded bitstream, so as to extract the biometric watermark, and to securely retrieve the electronic data.

21 Claims, 2 Drawing Sheets

BIOMETRIC WATERMARKS

CROSS-REFERENCE TO RELATED APPLICATIONS

This application claims priority from the following U.S. Provisional Applications: Ser. No. 60/046,012 filed May 9, 1997; Ser. No. 60/055,534 filed Aug. 13, 1997; and, Ser. No. 60/067,008 filed Dec. 1, 1997.

BACKGROUND OF THE INVENTION

1. Field of the Invention

This disclosure relates generally to the field of secure communications, and in particular to the secure transmission of data using biometric watermarks.

2. Description of Related Art

Electronic transactions and commerce, such as the transfer of electronic information in cyberspace, are generally conducted in a manner analogous to physical transactions such as commerce in goods and financial instruments in the physical world. For example, software programs are goods which may be transferred electronically between a seller and a buyer, and the cost of the purchase may be electronically transferred from the buyer to the seller in the form of credit card charge authorizations, electronic money (E-money), etc.

Because software programs have a value and may be transferred from one entity to another, such software programs face the dangers of counterfeiting and fraud in cyberspace. Such dangers are similar to the counterfeiting of physical entities having associated value and which may be transferred, for example, physical cash and credit cards.

Computer companies experience multi-billion dollar global losses annually due to fraud and counterfeiting of software. It is estimated that the annual global losses of "MICROSOFT" alone from software piracy exceed $2 billion. In addition, the music recording industry uses electronic and data manifestations of music which may be viewed as software. The Recording Industry Association of America (RIAA) has published a report indicating that numerous computer systems, such as Internet-accessible systems, provide databases and/or websites which offer pirated music. According to the RIAA report, the annual losses of legitimate companies in the music industry may be as large as $2 billion from the effects of pirated music.

Digital or electronic watermarks are used to add a layer of protection to valuable electronic products which may be transparent to users and counterfeiters alike. The term "watermark" is derived from the process of imprinting currency, such as United States $100 notes and postal money orders, with an unalterable image on the currency. In an analogous manner in cyberspace to the watermarks of the physical world, digital and/or electronic watermarks are data incorporated into a set of data such as a multimedia computer program which is electronically transparent for the purposes of electronic transactions and copying. As used herein, the term "electronically transparent" means that, without knowledge of the presence of the electronic watermark, one cannot distinguish the actual data from the electronic watermark data or from random noise.

Electronic watermarking may be incorporated into music data as well in a manner which does not affect the quality of the performance of the music when the electronic watermarks are removed from the music data. Further, digitized pictures such as paintings may have electronic watermarks incorporated therein indicating the owner and/or artist, which provides for improved security from unauthorized copying.

Heretofore, such electronic watermarking has been limited, for example, to specifying the publisher or owner's trademark or copyright, to specifying the name of the artist of the digitized painting, etc. Such relatively simple watermarking does not determine whether a subsequent copying of the watermarked electronic data is legal or illegal. For example, the purchasers of computer software may legally make a backup copy. The traditional electronic watermarking technologies do not assist in tracking down the sources of illegal copies such as pirate Internet websites using pirated multimedia information. In addition, traditional electronic watermarking is not protected from hackers who may detect and remove an electronic watermark with impunity.

SUMMARY OF THE INVENTION

It is recognized herein that the combination of biometric data with electronic watermarks provides for secure electronic transactions of electronic data.

A biometric watermark system and method generate a biometrically encoded bitstream from biometric data of a user and from electronic data to be transmitted to the user. The encoded bitstream has the biometric data acting as a biometric watermark. The encoded bitstream is then sent to a decoder of the user, with the biometric watermark providing security in the transmission to prevent unauthorized users from extracting the electronic data. The decoder utilizes the biometric data of the user to decode the biometrically encoded bitstream, to extract the biometric watermark, and thence to securely retrieve the electronic data.

BRIEF DESCRIPTION OF THE DRAWINGS

The features of the disclosed biometric watermark system and method are readily apparent and are to be understood by referring to the following detailed description of the preferred embodiments of the present invention, taken in conjunction with the accompanying drawings, in which.

DESCRIPTION OF THE PREFERRED EMBODIMENTS

Figure 1:
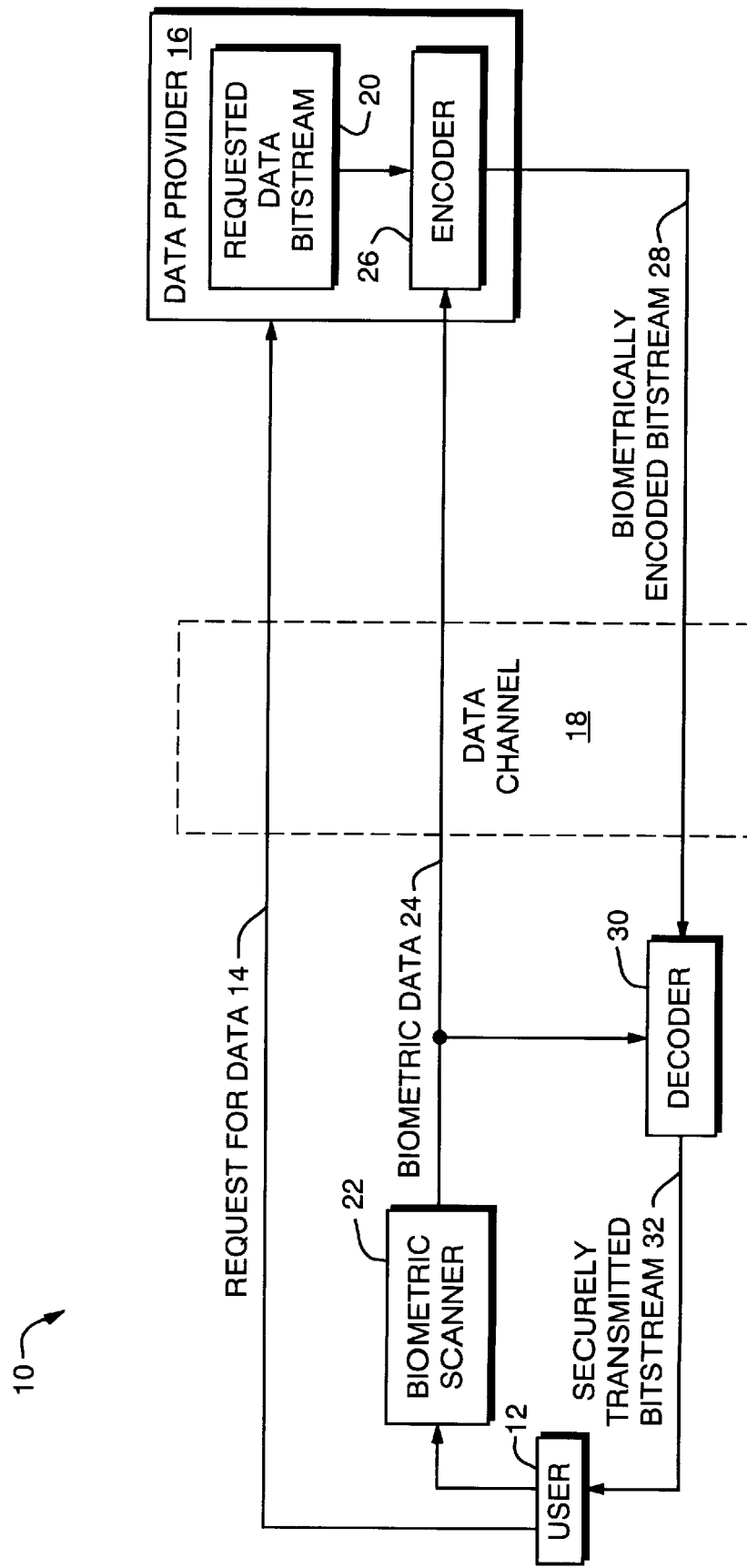
FIG. 1 illustrates a schematic of the disclosed biometric watermark system.

Referring in specific detail to the drawings, with common reference numbers identifying similar or identical elements, steps, and features, as shown in FIG. 1, a biometric watermark system 10 and method of use allow a user 12 to receive data in a secure manner by inserting biometric watermarks electronically into electronic data.

As shown in FIG. 1, the user 12 sends a request 14 for data to a data provider 16, which may be a database, a website on the Internet, a data processing clearing house for data transactions, etc. The request 14 for data may be an electronic purchase of software, music, multimedia products, etc., and may also include an exchange of electronic currency such as credit card information and/or E-money.

The request 14 for data may be sent via computer connections through a data channel 18, such as a telephone modem connection between a computer of the user 12 and a computer interface of the data provider 16. In alternative embodiments, the request 14 may be sent from the user 12 to the data provider 16 through a telephone such as through a human operator, through a touch-tone automated menu system, and/or through regular mail and thence through a mail order processing organization associated with the data provider. Accordingly, the request 14 may be sent independent of the data channel 18, and so may utilize less secure communications than the data channel 18.

The data provider 16 may process the request 14 and retrieve or otherwise prepare a requested data bitstream 20, corresponding to the request 14, to be sent to the user 12. The request 14 for data may be an electronic purchase or order of, for example, the "INTERNET EXPLORER 4.0" application program available from "MICROSOFT", and so the requested data bitstream 20 may be, for example, a data file or packet of at least 1 MB of data which constitutes the "INTERNET EXPLORER 4.0" application program.

Using the disclosed biometric watermark system 10 and method, the data provider 16 is capable of sending the requested data bitstream 20 to the user 12 with a biometric watermark uniquely identified with and corresponding to the user 12. The biometric watermark is generated for the specific user 12 according to the method as described in greater detail herein. In order to receive the requested data bitstream 20, the user 12 must first physically access a biometric scanner 22; for example, an iris or retinal scanner, a fingerprint and/or hand geometry scanner, a microphone and speech recognition system for recognizing speech patterns, etc. The biometric scanner 22 generates corresponding biometric data 24 which is unique to the user 12.

The biometric scanner 22 transmits the biometric data 24 through the data channel 18 to the data provider 16. In one embodiment, the data channel 18 may be a secure channel, with the biometric data 24 encrypted, for example, using public key cryptography systems which may be decrypted by the data provider 16. In alternative embodiments, the biometric data 24 may optionally itself be encrypted by either the same or different biometric data 24 associated uniquely with the user 12, using, for example, biometric certificates and biometric certifying authorities as described in U.S. Provisional Patent Application No. 60/046,012, entitled "BIOMETRIC CERTIFICATES" filed May 9, 1997, which is incorporated herein by reference. The data provider 16 may therefore include a biometric database (not shown in FIG. 1) for verifying the biometric certificate, and therefrom decrypting the biometric data 24 for verifying the user 12.

Upon receiving and optionally decrypting the biometric data 24, the data provider 16 applies the biometric data 24 and the requested data bitstream 20 to an encoder 26 which encodes the requested data bitstream 20 with the biometric data 24 using encoding techniques known in the art. For example, the encoder 26 may be a JPEG encoder, an MPEG encoder, an H.261 encoder, or other devices known in the art for encoding and/or compressing the requested data bitstream 20, which may be audio, video, imagery, software, graphics, text, or other data.

The encoder 26 uses the biometric data 24 to control the encoding process. For example, the biometric data 24, or a predetermined portion thereof, may be used to form a filter or mask for modifying discrete cosine transform (DCT) coefficients of an MPEG encoder. The masking may be performed, for example, by logically ORing a predetermined set of DCT coefficients having a value of zero, or any other predetermined coefficient value, which replaces the zero values with at least a portion of the biometric data 24. Subsequently, to remove the watermark upon decoding, the modified DCT coefficients may merely be zeroed out.

Accordingly, the encoded bitstream 28 is biometrically encoded to include a biometric watermark; that is, a watermark or modification of the data of the bitstream 20 based on the biometric data 24 unique to the user 12. Since biometric data 24 from each user 12 is unique as being based on the unique physical characteristics of the user 12, the corresponding biometric watermark encoded into the bitstream 20 is also unique. Without knowledge of the unique biometric data 24 of the user 12, one cannot remove the biometric watermark without corrupting the bitstream 20. Accordingly, the use of a secure data channel 18 ensures that the generation as well as the transmission of the biometrically encoded bitstream 28 is secure.

The data provider 16 then transmits the biometrically encoded bitstream 28 from the encoder 26 through the data channel 18 to a decoder 30 associated with the user 12. In addition, the decoder 30 receives the identical biometric data 24 from the biometric scanner 22. Since the identical biometric data 24 is used to encode the requested data bitstream, the biometric data 24 is uniquely able to remove the biometric data 24, and so to generate a securely transmitted bitstream 32 corresponding to the requested data bitstream 20, with improved security in processing the request 14 of the user and improve security from piracy.

In an alternative embodiment, the decoder 30 may decode the biometrically encoded bitstream 28 without removal of the biometric watermark. Any subsequent piracy of the bitstream 20 may be traced to any person involved in subsequent transfers and/or copying of the bitstream incorporating the unique biometric data of the requesting user 12. Accordingly, the biometric watermark also provides a unique trace to individuals involved in piracy of data, software, etc.

Figure 2:
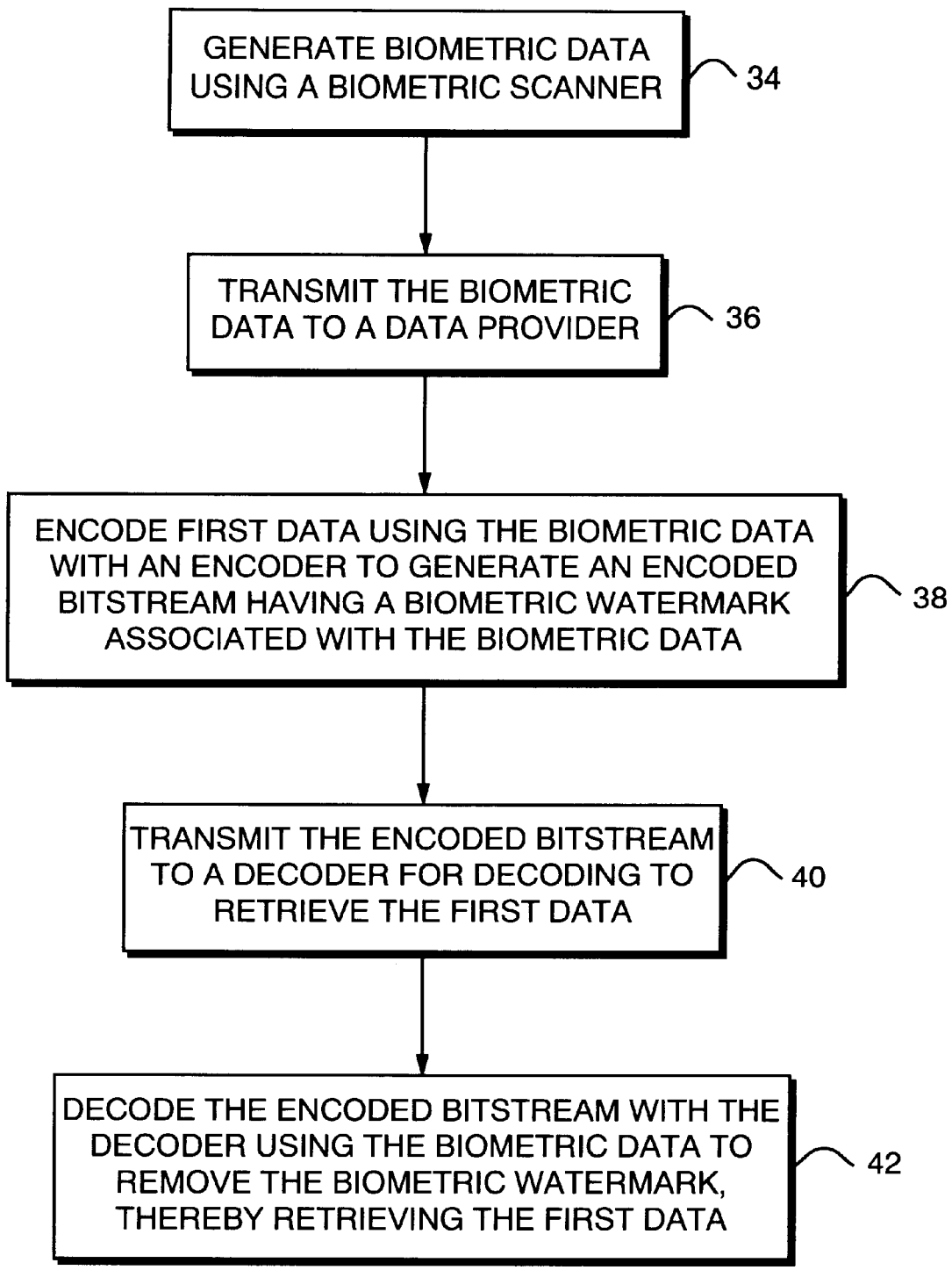
FIG. 2 illustrates a flowchart of the operation of the disclosed biometric watermark system.

The biometric watermark system 10 operates according to the method shown in FIG. 2, including the steps of generating biometric data 24 in step 34 using a biometric scanner 22; transmitting the biometric data 24 to a data provider 16 in step 36; and encoding first data with the biometric data 24 in step 38 with an encoder 26 to generate an encoded bitstream 28 having a biometric watermark associated with the biometric data 24. As described above, the first data may be a requested data bitstream 20 such as a purchased software application program or multimedia product requested by the user 12.

The method then transmits the encoded bitstream 28 to the decoder 30 in step 40, and decodes the encoded bitstream 28 in step 42 with the decoder 30 using the biometric data 24 to remove the biometric watermark, thereby retrieving the first data as a securely transmitted bitstream 32.

The application of biometrics as personal identifiers are therefore extended to electronic watermarks for electronic transactions, and thus are beyond the traditional use of biometric identifiers to protect access to operational software as well as to physical locations. Accordingly, end-to-end electronic transactions are provided with secure authentication and protection from fraud and unauthorized use, such as by theft.

In one embodiment, the disclosed biometric watermark system 10 may be used to allow the user 12 to order a movie electronically from a broadband distribution service storing movies electronically in a database as the data provider 16. The user 12 as a buyer sends an associated unique biometric identifier to the seller of the movie, and the biometric watermark is used by the encoder 26 of the seller and the decoder 30 of the buyer to ensure proper delivery and use of the purchased movie.

In another embodiment, the user 12 may purchase software on-line from an on-line software vendor maintaining selectable software titles and versions. The purchase of software on-line is thus empowered and secured through the use of biometric watermarks as disclosed herein. With the biometric watermarks encoded into software prior to delivery to the purchaser, only the true buyer with the corresponding biometric characteristics is capable of accurately decoding the information received from the on-line software vendor.

Due to the uniqueness of biometric data for individuals, biometric watermarks are thus sufficiently powerful and secure to prevent hacking and fraud. Further, any unauthorized user receiving the biometrically encoded bitstream 28 without the accurate extraction of the biometric watermark receives a scrambled bitstream, as the biometric watermark acts as noise within the bitstream. For example, a biometric watermark in video data may cause a video player attempting to play the video data to generate fuzzy or distorted video pictures. Similarly, the biometric watermark in audio data may cause an audio player attempting to play the audio data to generate garbled and noisy audio tracks.

In addition, since the amount of biometric data may be relatively large, such as 2 MB, the use of biometric watermarks generated by such large amounts of biometric data is computationally secure from decryption methods.

Accordingly, biometric watermarks not only protect licensing and royalty payments associated with information, such as software and music, but also ensure that the products are delivered to and used only by the individual authorized to receive and use the information. Such biometric watermarking may be applied equally in business-to-business electronic transactions as well as business-to-consumer transactions. Accordingly, business communications, such as through Internet telephony, as well as business documents, products, inventions, software, financial reports, mergers and acquisitions, and essentially every sensitive piece of information may be electronically secured and transmitted using such biometric watermarks.

While the disclosed biometric watermark system and method are particularly shown and described herein with reference to the preferred embodiments, it is to be understood that various modifications in form and detail may be made therein without departing from the scope and spirit of the present invention. Accordingly, modifications, such as any examples suggested herein, but not limited thereto, are to be considered within the scope of the present invention.

What is claimed is:

1. A method, performed by a data provider, for electronically watermarking data being provided to a user, comprising:
   receiving encrypted first biometric data originating from a user, the first biometric data corresponding to a physical characteristic of the user and being encrypted using second biometric data corresponding to a different physical characteristic of the user;
   retrieving electronic data to be provided to the user;
   decrypting the encrypted first biometric data; and
   encoding the electronic data using at least a portion of the first biometric data.

2. The method of claim 1, further comprising:
   scanning the physical characteristic of the user; and
   generating the first biometric data from the scanned physical characteristic.

3. The method of claim 2, wherein the scanning step is performed using a biometric scanner.

4. The method of claim 1, further comprising:
   providing the encoded electronic data to the user over a data channel.

5. The method of claim 4, wherein the data channel is a secure data channel.

6. The method of claim 1 wherein the step of encoding further comprises:
   encoding the electronic data using an MPEG encoding procedure producing at least a set of discrete cosine transform (DCT) coefficients; and
   modifying the set of DCT coefficients using the first biometric data.

7. The method of claim 1, wherein the electronic data includes at least one of: computer software, audio data, video data and audio-video data.

8. The method of claim 1, further comprising:
   receiving a payment from the user for the electronic data.

9. The method of claim 1, wherein the retrieving step further comprises:
   retrieving the electronic data in response to a user request for the electronic data.

10. The method of claim 1, wherein the first biometric data includes at least one of:
    iris data, retinal data, fingerprint data, hand geometry data and speech data.

11. The method of claim 1, wherein the encoding step includes encoding using at least one of: an MPEG format, a JPEG format and an H.261 format.

12. The method of claim 1, wherein the encoding step results in the encoded electronic data being distorted.

13. A method, performed by a user, for purchasing electronic data from a data provider, comprising:
    transmitting a user request for electronic data to a data provider;
    encrypting first biometric data corresponding to a physical characteristic of the user using second biometric data corresponding to a different physical characteristic of the user;
    transmitting, to the data provider, the encrypted first biometric data; and
    receiving the electronic data encoded with at least a portion of the first biometric data.

14. The method of claim 13, further comprising:
    decoding the electronic data using at least a portion of the first biometric data.

15. The method of claim 14, wherein the decoding step further comprises:
    removing at least a portion of the first biometric data from the encoded electronic data.

16. The method of claim 13, wherein the step of transmitting the encrypted first biometric data includes:
    scanning the physical characteristic of the user.

17. The method of claim 16, wherein the scanning step is performed using a biometric scanner.

18. The method of claim 13, wherein the step of transmitting the encrypted first biometric data further includes:
    transmitting the encrypted first biometric data over a secure data channel.

19. The method of claim 13, wherein the receiving step further includes:
    receiving the encoded electronic data over a secure data channel.

20. The method of claim 13, further comprising:
    transmitting a payment for the electronic data.

21. An apparatus for electronically watermarking data being provided to a user, comprising:
    a processor; and
    a memory storing a program for controlling the processor, the processor operative with the program to:
      receive encrypted first biometric data originating from a user, the first biometric data corresponding to a physical characteristic of the user and being encrypted using at least one second biometric data corresponding to a different physical characteristic of the user:
      retrieve electronic data to be provided to the user;
      decrypt the encrypted first biometric data; and
      encode the electronic data using at least a portion of the first biometric data.

* * * * *

UNITED STATES PATENT AND TRADEMARK OFFICE
CERTIFICATE OF CORRECTION

PATENT NO. : 6,208,746 B1
DATED : March 27, 2001
INVENTOR(S) : Hajime Shimamura et al.

It is certified that error appears in the above-identified patent and that said Letters Patent is hereby corrected as shown below:

Title page,
Please correct the name of the Assignee as follows:

-- [73] OKI ELECTRIC INDUSTRY CO., LTD
   Japan --

Signed and Sealed this

Twenty-fifth Day of December, 2001

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.    : 6,208,746 B1
DATED         : March 27, 2001
INVENTOR(S)   : Clyde Musgrave It is certified that error appears in the above-identified patent and that said Letters Patent is hereby corrected as shown below:

This certificate supersedes Certificate of Correction issued December 4, 2001, the number was erroneously mentioned and should be deleted since no Certificate of Correction was granted.

Signed and Sealed this

Third Day of September, 2002

Attest:

JAMES E. ROGAN
Attesting Officer    Director of the United States Patent and Trademark Office